Jan. 7, 1964   F. B. STENCEL   3,116,901
DEVICE FOR CUSHIONING THE LANDING OF AERIAL LOADS
Filed Jan. 23, 1961   4 Sheets-Sheet 1
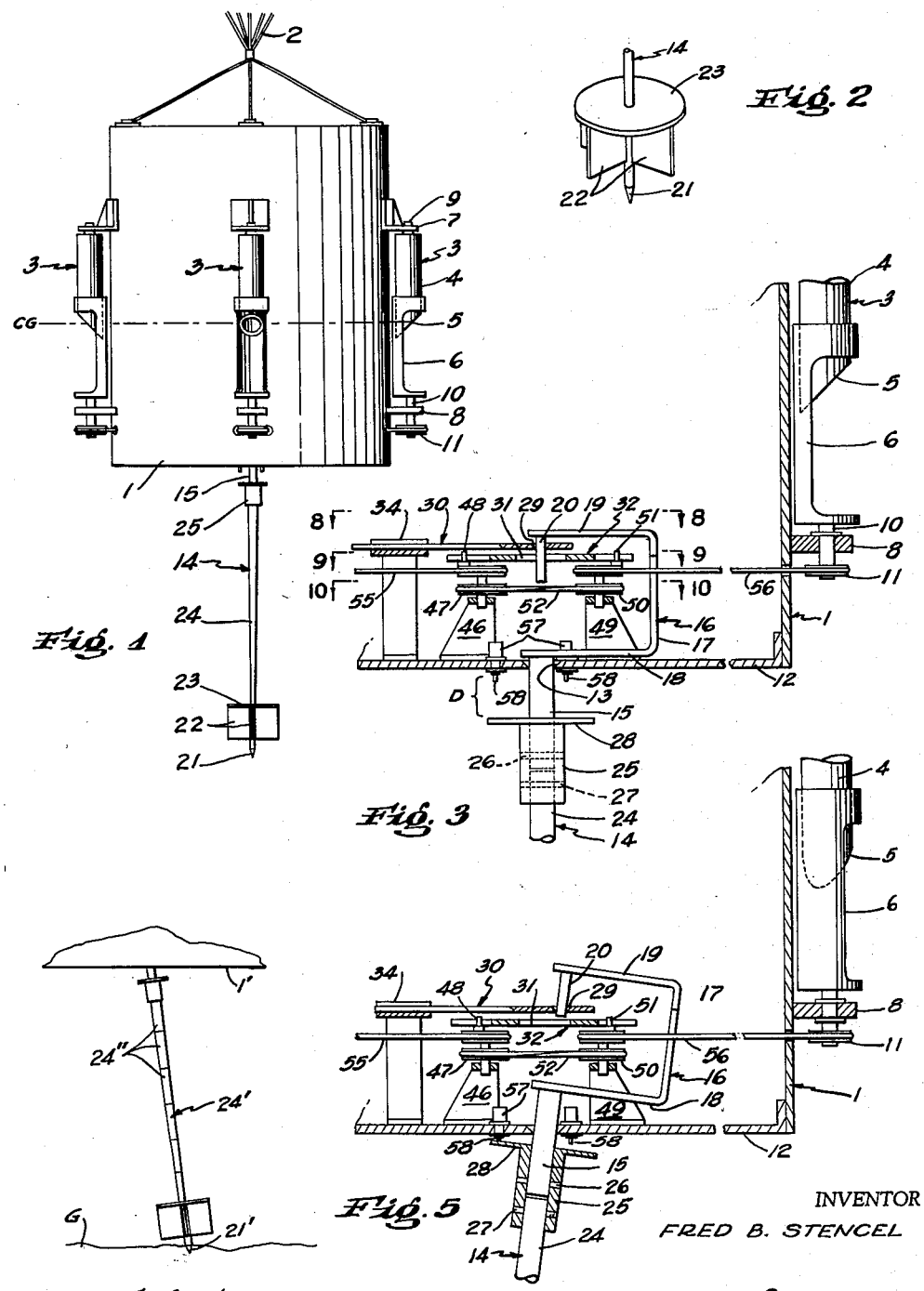
INVENTOR
FRED B. STENCEL
BY Arnold & Roylance
ATTORNEYS Jan. 7, 1964 — F. B. STENCEL — 3,116,901
DEVICE FOR CUSHIONING THE LANDING OF AERIAL LOADS
Filed Jan. 23, 1961 — 4 Sheets-Sheet 2
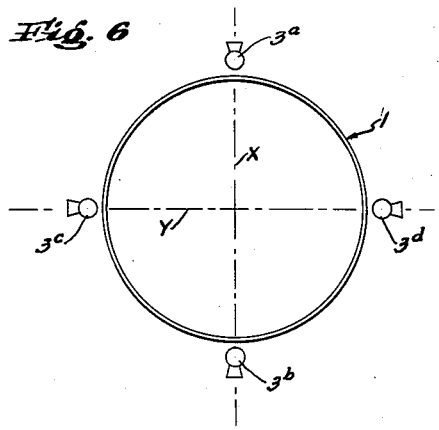
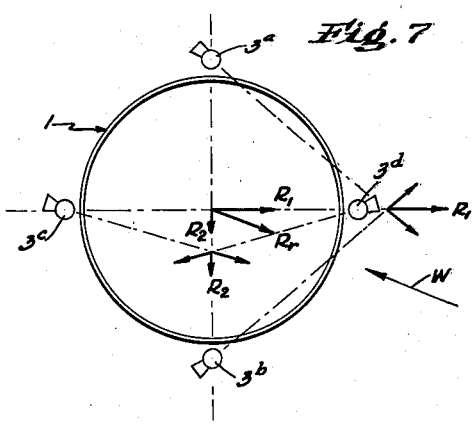
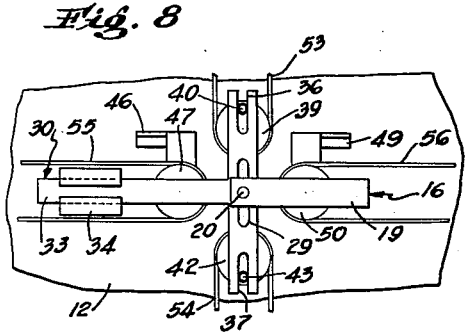
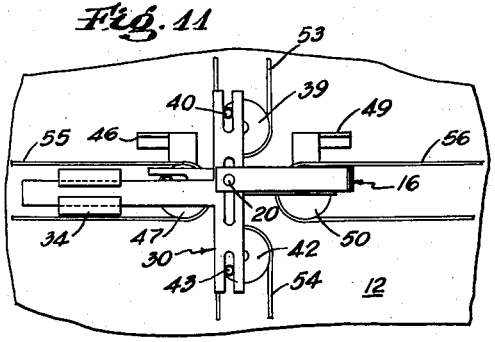
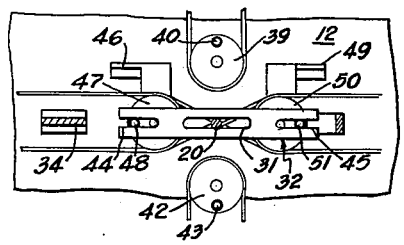
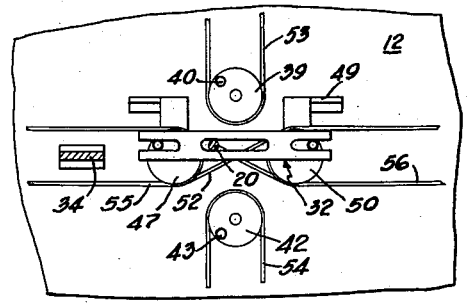
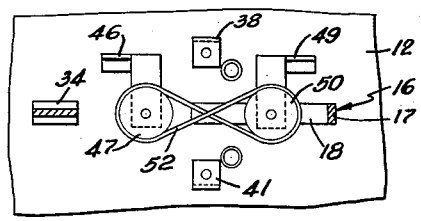
INVENTOR
FRED B. STENCEL
BY Arnold & Roylance
ATTORNEYS Jan. 7, 1964 F. B. STENCEL 3,116,901
DEVICE FOR CUSHIONING THE LANDING OF AERIAL LOADS
Filed Jan. 23, 1961 4 Sheets-Sheet 3

INVENTOR
FRED B. STENCEL

BY
ATTORNEYS

Jan. 7, 1964 F. B. STENCEL 3,116,901
DEVICE FOR CUSHIONING THE LANDING OF AERIAL LOADS
Filed Jan. 23, 1961 4 Sheets-Sheet 4
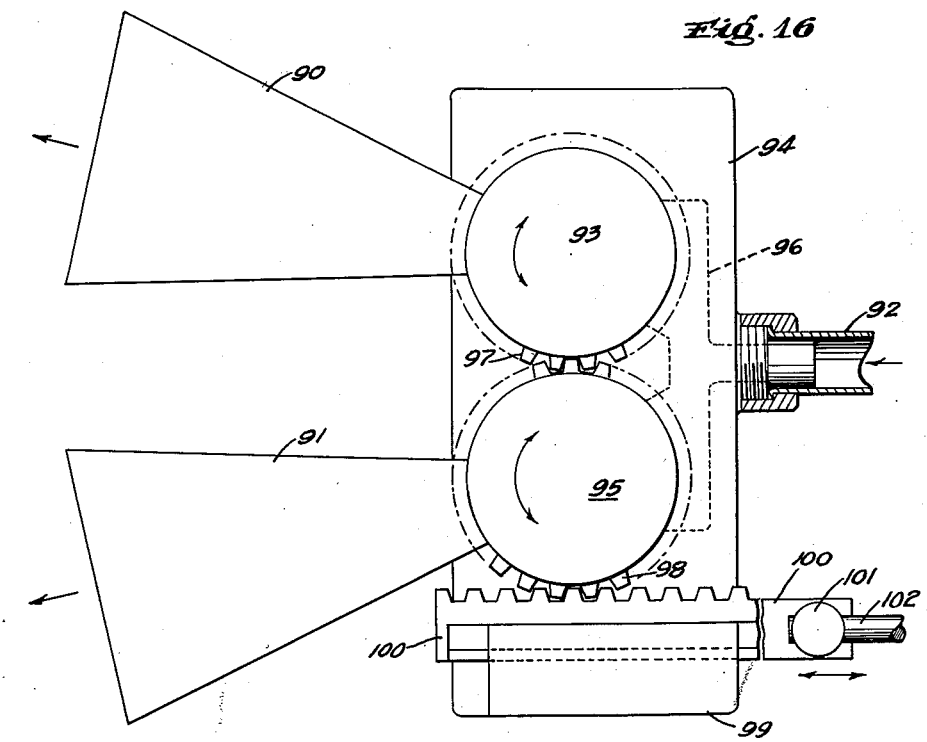
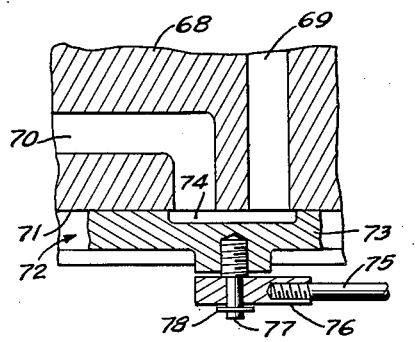
INVENTOR
FRED B. STENCEL
BY *Arnold & Roylance*
ATTORNEYS

United States Patent Office 3,116,901
Patented Jan. 7, 1964

3,116,901
DEVICE FOR CUSHIONING THE LANDING OF AERIAL LOADS
Fred B. Stencel, Asheville, N.C., assignor to Stencel Aero Engineering Corporation, Asheville, N.C., a corporation of North Carolina
Filed Jan. 23, 1961, Ser. No. 84,307
22 Claims. (Cl. 244—138)

This invention relates to the recovery of aerial loads and, more particularly, to a device for cushioning the landing of an aerial load.

As employed herein, the term "aerial load" is intended to include all loads descending from a point in air or space to a landing surface, whether the load be delivered by a supporting parachute, a guiding or drogue parachute, a paraglider, a rotary descent device, or in free fall, whether the load commences its flight from an aircraft, missile or other type of vehicle, and whether the landing surface be ground or water. The load itself may be an escape capsule of an aircraft missile, or space vehicle; a vehicle itself; any of various pieces of equipment and material which it is desirable to deliver or recover by parachute or in free fall; personnel; or other objects.

Even in the early art of conventional parachute recovery, various proposals have been made by prior-art workers to provide means for cushioning the load in order to decrease the danger of damage from impact or from rolling, dragging and the like subsequent to the impact of landing. Conventional parachute-supported loads descend at rates on the order of 25 feet per second, and, even at these relatively slow rates of descent, severe damage can be caused by impact of the load on the landing surface.

The overall problem of preventing damage to aerial loads is complicated by a number of factors. Perhaps the first of these is that it is generally desirable in modern practice to employ rates of descent which may be considerably greater than 25 feet per second. Thus, in the case of dropping of military equipment, the use of guiding or drogue parachutes, or even of free fall, is frequently preferable to the use of relatively slowly descending conventional parachutes. Further, modern requirements frequently call for delivery of relatively large loads, ranging into the thousands of pounds, for example, so that the cushioning forces required to bring the load to zero velocity become very large.

Another important complicating factor is that both vertical velocity and relative horizontal movement between the descending load and the landing surface must be dealt with. Thus, even in free fall, a descending load may have a very substantial horizontal drift caused by wind conditions. If the drift is not corrected, the load may drag or tumble along the ground after landing, even though its vertical movement is completely eliminated at the time of ground contact. A similar problem arises when the load descends into a body of moving water. In that event, the movement of the water creates a relative horizontal movement between the descending load and the water even when the load is descending without drift. Problems caused by existence of relative horizontal movement between a descending load and its landing surface also arise when the load is to be landed on a moving ship, for example.

Insofar as is known to applicant, no satisfactory means has heretofore been provided for cushioning aerial loads to prevent damage on landing. Most prior-art proposals in this regard have attempted to employ the principle of direct energy absorption and are therefore dependent upon the square of the impact velocity of the load. Typical of such devices are the usual crush pads, inflated bags and like "shock absorbers." Such prior-art cushioning devices have numerous disadvantages, particularly because they provide no compensation for horizontal components of motion, tend to cause "bouncing" and are generally incapable of cushioning relatively heavy loads.

A general object of the present invention is to provide an improved device of the type described which is capable of bringing even heavy aerial loads to substantially zero velocity, both as to horizontal and vertical components of motion, immediately prior to contact of the load with the landing surface.

Another object is to provide a cushioning device of the impulse type capable of automatically opposing both the horizontal and vertical movement of a descending aerial load.

A further object is to devise such a device which can be employed in conjunction with a parachute canopy, the latter being of such small size, in relation to the weight of the load, that wind dragging after landing is eliminated and the need for a canopy disconnect device is avoided.

Another object is to provide, for application to an aerial load, an effective device which is capable of automatically cancelling both the horizontal and vertical velocity of the load when the same has approached to within a predetermined distance of the landing surface.

Yet another object is to provide a device of the type described of such light weight as to equal, at most, only a small percentage of the weight of the load with which it is to be associated.

In order that the manner in which these and other objects are attained in accordance with the invention can be understood in detail, reference is had to the accompanying drawings, which form a part of this specification, and wherein:

FIG. 1 is a side elevational view of a device constructed in accordance with the invention for cushioning the landing of a parachute load;

FIG. 2 is a perspective view of a portion of a sensing probe employed in the device of FIG. 1;

FIG. 3 is a vertical sectional view, enlarged in scale, of a portion of the sensing and motion transfer means employed in the device of FIG. 1, showing the parts in their normal descent positions;

FIG. 4 is a fragmentary side elevational view illustrating the manner in which the sensing probe of the device of FIG. 1 engages the ground or other landing surface;

FIG. 5 is a view similar to FIG. 3 but showing the parts in adjusted positions accomplished by the sensing probe;

FIGS. 6 and 7 are diagrammatic views showing typical positions of the reaction motor devices employed in the device of FIG. 1;

FIGS. 8–10 are horizontal sectional views, with some parts shown in elevation, taken respectively on lines 8—8, 9—9 and 10—10, of FIG. 3, with the parts positioned in accordance with the conditions of FIG. 6;

FIGS. 11 and 12 are views corresponding to FIGS. 8 and 9, respectively, but with parts positioned in accordance with the conditions of FIG. 7.

FIG. 15 is a detail sectional view illustrating a slide valve employed in the device of FIG. 13, and FIG. 16 is a plan view illustrating a dual reaction motor nozzle unit alternatively useful in the embodiment of FIGS. 1 and 13.

Figure 13:
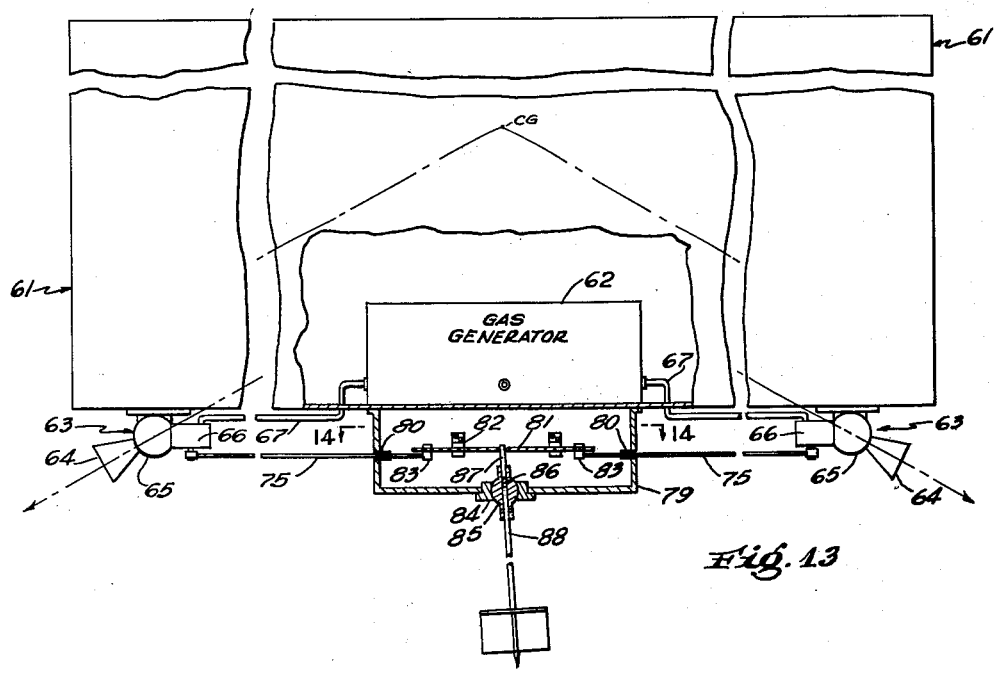
FIG. 13 is a semi-diagrammatic view, partly in side elevation and partly in vertical section, of a device constructed in accordance with another embodiment of the invention.

In general, cushioning devices in accordance with the invention employ reaction motor means such, for example, as a plurality of individual rockets, the arrangement being such that the thrust provided by the reaction motor means includes both horizontal and vertical components when the load is not in its intended descent attitude. Additionally, the device comprises sensing means, such as a dependent ground probe, arranged to detect the horizontal component of relative motion between the load and the landing surface when the load has approached to within a given distance of the landing surface. The output of the sensing means is converted, by any suitable control mechanism, into adjustment of the rocket motor means in such fashion that the horizontal component of the thrust provided by the motor means cancels the horizontal component of the relative movement between the load and the landing surface, the vertical component of the thrust cancelling the vertical velocity of the load. Location of the rocket nozzles is such that both the horizontal and vertical components of the resulting thrust pass through the load center of gravity, so that tilting of the load by the rocket thrust is avoided.

Referring now to the drawings in detail, it will be seen that the specific embodiment of the invention here illustrated comprises a load carrier or container 1 which is of cylindrical configuration, the suspension lines 2 of any suitable parachute being connected to the top of the container 1. Four rocket devices 3 are mounted on the outer wall of container 1 in such fashion that each rocket device is diametrically opposed across the container from another one of the rocket devices. It being understood that the load in question is housed wholly within container 1, it can be seen that the container is also employed here as a frame means to support the rocket devices.

The rocket devices 3 are identical, each comprising a cylindrical main body or propellant chamber 4, a nozzle 5 and a shield 6. Each rocket device 3 is disposed with the longitudinal axis of chamber 4 extending parallel to the axis of container 1 and is mounted for rotation about the axis of its chamber 4, as by bearing brackets 7 and 8 fixed to the wall of container 1. Bearing brackets 7 and 8 have aligned bearing openings. At its top end, chamber 4 is provided with a stub shaft 9 normally rotatably disposed in the bearing opening of bracket 7, shaft 9 including a conical thrust bearing portion effective to hold the rocket device against rotation whenever the rocket device is fired and develops thrust. Rigidly attached to chamber 4, the shield 6 is provided at its lower end with a shaft 10 extending through the bearing opening of bracket 8 and projecting therebelow. A pulley 11 is fixed to the lower end portion of shaft 10, below bracket 8.

The nozzle 5 of each rocket device 3 is so constructed as to discharge the products of combustion of the rocket downwardly and outwardly relative to the longitudinal axis of chamber 4. In this embodiment, nozzles 5 are disposed to exhaust along lines extending at 45° with respect to the longitudinal axis of chamber 4, the arrangement being such that both the horizontal component and the vertical component of the thrust provided by the nozzles pass through the center of gravity of the combined load, container and associated elements. Advantageously, the rocket device 3 may be of that conventional, solid propellant type presently known to those skilled in the art as RAPAC I. Each such device is equipped with electrical or pyrotechnic igniting means (not shown) in a manner well known in the art.

As seen in FIG. 3, container 1 includes a flat bottom wall 12 which is disposed in horizontal plane when the container is in its intended normal descent attitude. At its center, the bottom wall 12 is provided with a circular opening 13, the wall of opening 13 being frusto-conical and tapering downwardly. A ground probe, indicated generally at 14, extends through opening 13. In this embodiment, at least the upper end portion 15 of probe 14 is of circular transverse cross section and so dimensioned as to lightly engage the wall of opening 13 at the point of minimum diameter of the opening. At its free end, portion 15 of the probe has rigidly secured thereto a U-shaped yoke 16. Assuming that probe 14 is in its normal position, seen in FIGS. 1 and 3, the base 17 of the yoke is at right angles to wall 12, leg 18 extends along and is parallel to the upper surface of wall 12 and the remaining leg 19 is spaced a substantial distance above wall 12. A cylindrical pin 20 is fixed to the tip portion of leg 19 of the yoke and projects toward probe 14, being coaxial therewith.

At its lower end, the probe 14 has a pointed tip 21. Immediately above tip 21, four laterally projecting fins 22 are rigidly secured to the probe, fins 22 projecting from the probe in coplanar pairs with the pairs being disposed at right angles to each other, as illustrated in FIG. 2. The top edges of fins 22 are joined to a circular, normally horizontal plate 23, while the bottom edges of the fins are free. The probe can be considered as including a main body portion 24 joined to top portion 15 by a collar 25 and shear pins 26 and 27, as best seen in FIGS. 3 and 5. Collar 25 is provided at its top end with an outwardly directed circular flange 28 extending at right angles to the longitudinal axis of the probe.

As will be evident by comparison of FIGS. 3 and 5, the lower extremity of the wall of opening 13 constitutes a bearing which allows probe 14 to pivot about any axis lying in the plane of the bottom face of wall 12. Any such pivotal motion is imparted to pin 20 because of the rigid nature of yoke 16 and its rigid attachment to top portion 15 of the probe.

Referring specifically to FIG. 3, it will be seen that when the probe is in its normal position, pin 20 projects downwardly first through an elongated opening 29 in a first slide 30 and then through an elongated opening 31 in a second slide 32. Referring to FIG. 8, slide 30 is of T-shaped plan configuration, the stem 33 thereof being slidably supported in a horizontal guideway 34 which is fixedly mounted on wall 12. The cross bar 35 of slide 30 is provided at its free ends with outwardly opening slots 36 and 37.

Disposed below the normal position of one end of portion 35 of slide 30 and mounted on wall 12 by a bracket 38, FIG. 10, in such fashion as to rotate about an axis at right angles to wall 12 is a pulley 39. A crank pin 40, spaced from the axis of pulley 39, is fixed to the pulley and projects upwardly through slot 36. Similarly mounted on wall 12 by a bracket 41, FIG. 10, is an identical pulley 42 to which is fixed an upwardly projecting eccentric crank pin 43. Pulley 42 is disposed beneath the normal position of the opposite end of portion 35 of slide 30 and pin 43 projects upwardly to engage in slot 37.

Slide 32 is a simple metal strip extending at right angles to portion 35 of slide 30 and provided at its ends with slots 44 and 45. Disposed beneath the normal position of one end portion of slide 30 and rigidly fixed to wall 12 is a mounting bracket 46 in which is journaled, for rotation about an axis at right angles to wall 12, a double pulley 47. A crank pin 48 projects upwardly from the upper pulley portion of double pulley 47 and engages in slot 44 of slide 32. Similarly, a bracket 49, fixed to wall 12, rotatably supports a double pulley 50, a crank pin 51 being fixed to the upper member of the double pulley and projecting into engagement in slot 45. An endless belt 52, FIG. 10, is engaged with the lower members of the two double pulleys 47, 50 and is crossed upon itself, to travel a figure-eight path so that rotation of the two double pulleys is equalized, though it will be understood that the two double pulleys must, by reason of the engagement of pins 48 and 51, respectively, with slots 44 and 45, be in opposite directions.

Because of its association with guideway 34 and the engagement of pins 40 and 43 in slots 36 and 37, respectively, slide 30 is restricted to move in rectilinear fashion, between left and right, as viewed in the drawings. Portion 35 thereof is therefore always directed across the circular transverse cross section of container 1. When probe 14 is in the normal position seen in FIG. 3, portion 35 of slide 30 is aligned diametrically between two of the four rocket devices 3, these two rocket devices being indicated at 3ª and 3ᵇ in the diagrammatic illustration of FIG. 6. Because of the presence of equalizing belt 52, and the engagement of pins 48 and 51, respectively, in slots 44 and 45, slide 32 is constrained for horizontal rectilinear movement at right angles to the direction of motion of slide 30. When probe 14 is in the normal position seen in FIG. 3, slide 32 is aligned diametrically between the other two of the four rocket devices, these two rocket devices being indicated at 3ᶜ and 3ᵈ in FIG. 6. Accordingly, elongated openings 29 and 31 are maintained at right angles to each other.

The combination of slots and pulleys just described constitutes a mechanical movement wherein the four pulleys 39, 42, 47 and 50 can be considered as output elements and the yoke 19, with its pin 20 engaged in crossed openings 29 and 31, can be considered as the input element. Assuming that probe 14 is pivoted about an axis X, FIG. 6, extending between rocket devices 3ª and 3ᵇ, the motion imparted to pin 20 will result in movement of slide 30 either to the left or right, as viewed in FIG. 8. If tip 21 of the probe moves to the right (as viewed) the resulting motion of slide 30 will be to the left, so that this slide may be brought to the position illustrated in FIG. 11. Here, slide 30 is illustrated as having been moved by an amount less than the radial spacing of pins 40, 43 from the axes of rotation of pulleys 39, 42, such movement being effective to cause pulleys 39, 42 to rotate oppositely each through approximately 45°. Here, it has been assumed that the probe pivoted only about axis X and it will be apparent that such motion would result in no movement of slide 32.

If the probe be pivoted about axis Y, FIG. 6, extending between rocket devices 3ᶜ and 3ᵈ, the resulting movement imparted to pin 20 would have no effect on slide 30 but would cause slide 32 to move either upwardly or downwardly, as viewed in FIG. 9, depending on the direction in which the probe was pivoted. Referring to FIG. 3, and assuming that the probe has been pivoted to bring the lower tip thereof toward the viewer, slide 32 will be moved upwardly, as viewed in FIG. 9, and therefore is actuated, for example, to the position seen in FIG. 12. Such upward movement of slide 32 results in simultaneous, equal but opposite rotation of pulleys 47, 50.

Pulleys 39, 42, 47 and 50 cooperate with endless belts 53, 54, 55 and 56, respectively, these belts being employed to accomplish rotational adjustment of the four rocket devices. As seen in FIG. 3, the endless belt 56 is engaged about the pulley 11 connected to that one of the rocket devices indicated at 3ᵈ in FIG. 6. Belts 53, 54 and 55 are engaged in the same fashion about those pulleys connected to the rocket devices designated 3ª, 3ᵇ and 3ᶜ, respectively, FIG. 6. It will accordingly be clear that equal rotational movements imparted to pulleys 39 and 42 will be transferred into equal rotational adjustments of the rocket devices indicated at 3ª and 3ᵇ in FIG. 6. Since the pulleys 39 and 42 must always rotate in opposite directions, the rocket devices indicated at 3a and 3b similarly must be adjusted oppositely. It will also be clear that rotational movements imparted to pulleys 47 and 50 will be transferred into rotational adjustments of the rocket devices indicated at 3ᶜ and 3ᵈ in FIG. 6, pulleys 47 and 50 being constrained to rotate oppositely and rocket devices 3ᶜ and 3ᵈ therefore being adjusted oppositely.

Though only simple pivotal movements about axes X and Y, FIG. 6, have been considered thus far, it will be obvious that the probe 14 can pivot about any horizontal axis lying in the plane of the bottom face of wall 12 and that, if the axis of pivotal movement of the probe is other than at X or Y, the pivotal movement of the probe will be effective to move slides 30 and 32 simultaneously. Thus it is to be understood that the actuations of the two slides, as illustrated in FIGS. 11 and 12, can and normally will occur simultaneously. If the two slides are moved simultaneously, then it is obvious that all of the four rocket devices are adjusted simultaneously.

A plurality of conventional push button type electrical switches or pyrotechnic initiators 57 are mounted on wall 12 with the actuating member 58 thereof exposed below the wall and projecting downwardly, the switches being so positioned that all of the actuating members 58 are vertically aligned with flange 28 of collar 25. It is thus apparent that, so long as the probe 14 remains intact, it is allowed to move vertically through a distance D, FIG. 3, which is the distance between the normal position of the top face of flange 28 and the actuated position of any of the switch members 58. The switches 57 are so disposed that, regardless of the manner in which probe 14 pivots, at least one of the switches 58 will be actuated, in the fashion seen in FIG. 5, at the end of the upward travel of the probe.

Switches 58 are so connected electrically that the closing of any one of the several switches will result in simultaneous ignition of all of the rocket devices 3. The parts, including particularly actuating members 58 and flange 28, are so dimensioned and arranged that firing occurs as, during its upward movement, pin 20 escapes from slot 29.

From the foregoing description, it will be clear that, as the container 1 approaches the landing surface, the tip 21 of probe 14 will first engage the landing surface and cause the probe to be moved upwardly through the distance D. During such upward movement, any relative horizontal movement between the container 1 and the landing surface will result in a corresponding pivotal movement of the probe. Such pivotal movement, determining the position of pin 20, will be imparted to slides 30 and 32 during that relatively brief time interval between the instant of contact between the probe and the landing surface and that instant when one or more of the switches 57 is actuated. The movement imparted to the slides 30 and 32 is in turn instantaneously reproduced as rotational adjustments of the four rocket devices, such adjustments also occurring prior to actuation of any of the switches 57. Thus, the rocket devices are first rotationally adjusted to assure that the net horizontal component of the thrust provided by the rocket devices will oppose the horizontal component of the relative movement between the load and the landing surface, and one of the switches 57 is then actuated to simultaneously fire all of the rockets, both the adjustment and the firing of the rockets occurring when the container 1 is still spaced substantially above the landing surface. As the rockets develop thrust, the conical thrust bearings at the upper ends of rocket chambers 4 prevent further rotation thereof, so that the adjusted positions of the rocket devices are maintained so long as they provide thrust. Further downward movement of the container 1, after actuation of one of the switches, results in rupturing of shear pins 26, 27, so that probe portion 15 is pushed from collar 25 and the balance of the probe, including collar 25, is freed from the apparatus.

Referring to the diametric illustration of FIG. 7, it is here assumed that, as the device approaches the landing surface, it has a drift resulting from wind in the direction indicated by arrow W. Thus, the container 1 has not only a vertical velocity but also a horizontal velocity having the direction of arrow W. Accordingly, contact of probe 14 with the ground will cause the probe to be pivoted about a horizontal axis extending along the bottom face of wall 12 perpendicular to the arrow W. Such pivotal movement actuates slides 30 and 32 to the respective positions seen in FIGS. 11 and 12. Since slides 30 and 32 are actuated to these positions, the rocket devices are adjusted to the positions indicated at 3ᵃ–3ᵈ in FIG. 7 and occupy these adjusted positions at the time of firing of the rockets.

Since the thrust of all of the rocket devices is directed downwardly, due to the angle of disposition of the rocket nozzles 5 with respect to the axis of descent of container 1, the thrust provided by the rockets will have a vertical component in opposition to the vertical velocity of container 1 independent of the adjusted positions of the rocket devices. The weight of container 1, the load therein and those elements constituting the cushioning device of the present invention is known and since the vertical velocity, dependent upon the circumstances of the particular application, is also known, it is obvious that rocket devices can be made effective to provide thrust having a vertical component which will precisely cancel the vertical velocity of the container 1 within the vertical distance determined by the length of probe 14.

As illustrated by the vector diagrams of FIG. 7, the adjustments imparted to the rocket devices are effective to assure that the net horizontal component of the thrust from the rocket devices will directly oppose the drift velocity of the container 1 resulting from the wind indicated by arrow W. In this regard, the resultant $R_1$ indicates the net horizontal thrust component from the rocket devices indicated at 3ᵃ and 3ᵇ, in their adjusted positions. Similarly, the resultant $R_2$ represents the net horizontal thrust from the rocket devices indicated at 3ᶜ and 3ᵈ, in their adjusted positions. The overall net horizontal component of the total rocket thrust can thus be indicated as the resultant $R_r$ and it will be noted that the resultant $R_r$ is in direct opposition to the drift resulting from the wind in the direction of the arrow W which was sensed in the manner hereinbefore described. Since both the horizontal and vertical components of the thrust from the rocket devices pass through the center of gravity, the effect of the rocket devices is accomplished without tilting of the assembly.

Assuming that the landing surface is the surface of the ground, the pointed tip 21 of probe 24 will penetrate the ground to assure that a positive pivotal motion is instantaneously applied to the probe. Should, however, the landing surface be water, it is obvious that the probe will penetrate the water so that fins 22 are immersed. Any relatively horizontal movement between container 1 and the water, whether resulting from the drift or water currents or both will obviously act instantaneously on the probe by reason of the broad lateral surfaces provided by fins 22.

While, in the embodiment described, the main body portion 24 of probe 14 has been considered as in the form of a continuous shaft, the probe can alternatively take the advantageous form illustrated in FIG. 4. Here, the main body portion 24' of the probe is composed of a relatively large number of telescopically assembled sections 24". The sections 24" engage each other with a substantial amount of friction but, considering the velocity and the weight of container 1' and the load contained thereby, telescope readily, once tip 21' has engaged the landing surface G. Alternatively, the telescopic sections can be held in fixed relation by shear pins. The telescopic action of the probe allows the probe to remain intact and provide its pivotal input to the slides 30 and 32 for a material length of time.

While the embodiment of the invention shown in FIGS. 1–12 accomplishes control of the reaction motor means by rotatively adjusting the rocket nozzles, the same generic result can be attained by selectively varying the rocket exhausts, as will now be explained with reference to FIGS. 13–15. Here, the load carrier 61 is again in the form of a container of any suitable size and shape, and a conventional gas generator 62 is mounted therein. Four rocket devices 63 are rigidly mounted on the bottom of container 1, the rocket devices being arranged in a circle about the central axis of container 1, spaced from each other by 90° so that the four devices include two pairs of opposed devices.

Each rocket device 63 includes a nozzle 64, a body 65 and a control valve 66, the nozzle and body for each device being rigidly interconnected, and rigidly secured to container 61, so that the nozzle has a fixed thrust angle which is directed downwardly and outwardly along a line passing through the center of gravity of the container, load and associated equipment. The thrust of each rocket device 63 is thus always directed in a line which lies in a plane including the central vertical axis of container 61, these planes being at 90° with respect to each other for adjacent ones of the rocket devices. As indicated, the thrust lines for the several nozzles all intersect at the center of gravity of the container, load and associated equipment, so that the container will not be tipped by the net thrust of the nozzles.

Connected to gas generator 62 are four conduits 67, each leading to a different one of the rocket devices 63 and each being operatively connected to its respective rocket device to supply gaseous combustion products from generator 62 to the rocket device via the corresponding control valve 66. Accordingly, when gas generator 62 has been placed in operation, the rocket devices 63 will be supplied with gas under pressure in a manner controlled by valves 66 and each of the rocket devices will accordingly provide thrust dependent upon the setting of the control valve for that particular rocket device.

As seen in FIG. 15, each control valve 66 comprises a valve body 68 having an inlet duct 69, to which one of the conduits 67 is connected, and an outlet duct 70, leading to the corresponding exhaust nozzle 64. Ducts 69 and 70 open side-by-side through a wall 71 which forms part of a guide way 72. A reciprocable valve member 73 is retained in guide way 72 in such manner as to be movable back and forth across the openings of ducts 69, 70, the valve member 72 having a recess 74 of such shape and size as to register simultaneously with the openings of both ducts 69 and 70, and so place the ducts in communication with each other, when member 73 is in the position illustrated. Movement of member 73, in either direction along guide way 72, will progressively limit the amount of gas which can flow from duct 69 into duct 70 and ultimately will result in complete interruption of such flow.

Each of rocket devices 63 is so mounted that the guide way 72 of the corresponding valve 66 extends radially with respect to the vertical central axis of container 61. To each of the movable valve members 73, there is pivotally connected an operating rod 75, each rod 75 extending generally toward the vertical central axis of container 61. Thus, an end of rod 75, FIG. 15, can be threadedly connected to a block 76, the block having a plain cylindrical bore through which extends a pin 77 fixed to valve member 73, the block being retained on pin 77 by a retaining clip 78. Thus, while rod 75 can swing about the axis provided by pin 77, movements of the rod radially of the central vertical axis of container 1 are imparted accurately to valve member 73 to move the same along its guide way 72.

Mounted at the center of the bottom wall of container 61 is a cylindrical housing 79 provided with four horizontally extending lateral openings 80, each of rods 75 extending through a different one of the openings 80 into the interior of housing 79. A horizontally disposed circular plate 81, having a substantially smaller diameter than does the side wall of housing 79, is mounted within the housing for universal horizontal movement. Such mounting is accomplished by slide bearings 82 which are fixed to the side wall of the housing and provided with horizontally extending slots which open inwardly with respect to the housing and into which the plate 81 projects. The slots in bearings 82 are of such depth as to allow plate 81 to have a considerable degree of freedom of movement horizontally, and of such thickness that, while plate 81 is slidable therein, it is frictionally held to a degree such that a material horizontally directed force is required to shift the plate. The end of each rod 75 which is disposed within housing 79 is fixed to a pivot block 83 mounted on plate 81 for rotation about a vertical axis, blocks 83 being fixed against any movement relative to plate 81 other than such rotation. Thus, horizontal shifting of plate 81 in any direction will result in linear movement of each valve member 73, and the extent of such movement will be related to both the direction and extent of the movement of plate 81.

At the center of the bottom wall of housing 79, there is fixedly mounted an outer spherical bearing member 84. An inner spherical bearing member 85, provided with a central bore 86, is retained within bearing member 84. A pin 87 is frictionally retained in the upper end portion of bore 86 and projects upwardly therefrom through a circular opening in plate 81. Frictionally retained in the lower portion of bore 86 is the upper end of a ground probe 88, which advantageously embodies elements corresponding to elements 21–24 hereinbefore described with reference to FIGS. 1 and 2.

When probe 88 engages the ground or other landing surface, it is forced upwardly in bore 86 so as to engage pin 87 and force the pin upwardly. Pin 87 engages the wall of the central opening in plate 81 with a sliding fit. Hence, pin 87 moves upwardly through plate 81 until the pin escapes bore 86. At this point, the control function of probe 88 is complete, and plate 81 is held in its adjusted position by reason of its frictional engagement in bearings 82. Further descent of container 61 causes probe 88 to be broken away, and this action can be aided by providing the probe with a stop and shear area (not shown) if desired. Alternatively, the probe can be constructed for telescopic collapsing and can be provided with a stop collar (not shown) to engage member 85 and initiate the telescopic action.

Figure 14:
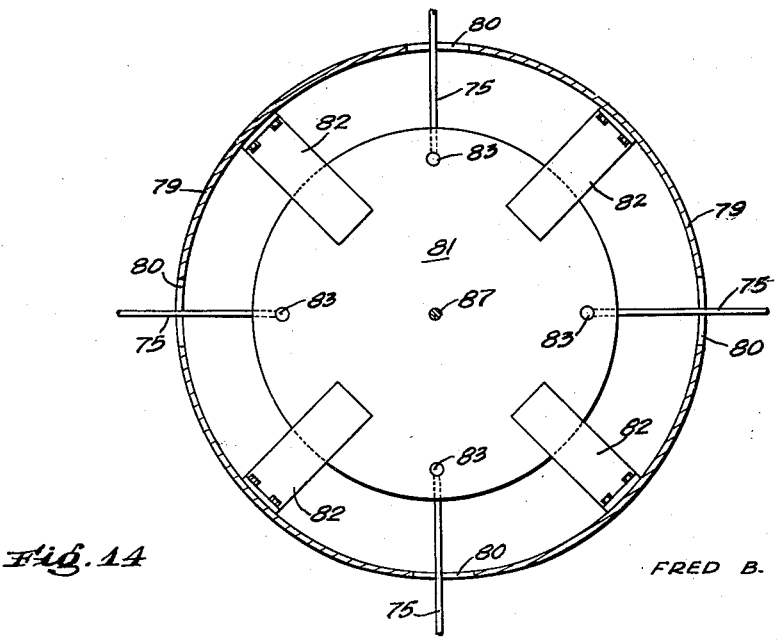
FIG. 14 is a sectional view taken on line 14—14, FIG. 13, with some parts shown in plan elevation.

It is thus seen that, in the embodiment of the invention illustrated in FIGS. 13–15, pivotal movement of probe 88, in any direction allowed by bearing members 84 and 85, is converted into a horizontal shifting movement of plate 81, the shifting movement of plate 81 being converted via rods 75 into adjustments of valve members 73 to selectively control the amount of thrust provided by the four rocket devices 63. The arrangement is such that, if container 61 is descending with a horizontal component of movement to the left, as viewed in FIGS. 13 and 14, so that probe 88 is pivoted with its bottom tip moving to the right, the valve 66 for the one of the rocket devices seen at the left will be adjusted to increase gas flow from that rocket device, while the control valve for the one of the rocket devices seen at the right will be adjusted to decrease gas flow from that rocket device. Hence, the rocket device seen at the left provides a greater thrust, and the one at the right a lesser thrust, compensating for the horizontal component of movement which resulted in pivoting of the ground probe. This simplified explanation has assumed the horizontal component of movement to be aligned with two of the rocket devices and at right angles to the direction of thrust of the other two rocket devices. Obviously, however, any horizontal movement of plate 81 caused by pivoting of the ground probe 88 will result in selective adjustment of control valves 66 in such a manner that the net thrust from the four rocket devices 63 opposes the horizontal component of movement of container 1 which caused the probe to be pivoted.

Activation of gas generator 62 in response to engagement of probe 88 with the ground or other surface can be accomplished in any suitable fashion. Thus, a pyrotechnic initiator for the gas generator can be arranged to be actuated by either the upper end of probe 88 or the pin 87. Alternatively, probe 88 can be provided with a flange or other lateral projection (not shown) to engage and actuate either an electrical switch or a pyrotechnic initiator in the same manner hereinbefore described with reference to elements 28 and 58, FIGS. 1, 3 and 5. Using any of such arrangements, operation of the gas generator 62 commences substantially instantaneously upon engagement of the probe with the surface on which container 61 is to land.

While the embodiment of FIGS. 13–15 has been illustrated and described as employing slide valves with reciprocating elements, it will be obvious to those skilled in the art that rotary control valves can be employed, operated by belt and pulley means of the general type described with reference to FIGS. 1–12.

As will be clear from the following description of the dual-nozzle rocket device illustrated in FIG. 16, the reaction motor means can be controlled in other ways than by changing the effective thrust direction or valving the combustion products to be exhausted for thrust production. The rocket device of FIG. 16 is useful in the embodiment of FIG. 13, for example, and comprises a pair of pivotable exhaust nozzles 90 and 91 both supplied with gases under pressure via supply conduit 92 (corresponding to one of the conduits 67, FIG. 13). Nozzle 90 is fixed to a hollow body 93 which is rotatably mounted on a fixed main body 94. Nozzle 91 is fixed to a hollow body 95 which is also rotatably mounted on main body 94. Main body 94 has branched ducting 96 communicating between supply conduit 92 and the interiors of bodies 93, 94, so that the gases are supplied equally to nozzles 90 and 91. Thus, for any condition of gas supply via conduit 92, nozzles 90 and 91 develop equal thrusts.

Bodies 93 and 95 are generally cylindrical and are arranged side by side for rotation about parallel axes. Body 93 is provided with a pinion 97, and body 95 with a pinion 98, the two pinions meshing, as shown, so that rotation of body 95 through a given angle in either direction causes body 93 to rotate through the same angle in the opposite direction.

A portion of main body 94 coacts with a member 99, fixed to body 94, to define a guide way in which a rack member 100 is confined for reciprocatory movement in a direction at right angles to the axes of rotation of bodies 93 and 95. Rack member 100 is so positioned that its teeth are operatively meshed with pinion 98. Hence, movement of the rack member to the right, as viewed in FIG. 16, rotates bodies 93 and 95 in directions swinging nozzles 90 and 91 away from each other, and movement of the rack member to the left, as viewed, rotates bodies 93 and 95 in directions swinging nozzles 90 and 91 toward each other. Accordingly, movement of rack member 100 to the right tends to decrease the net thrust of the rocket device, since a greater angle between the two nozzles results, and the opposite movement of the rack member tends, by decreasing the angle between the two nozzles, to increase the net thrust of the rocket device.

Rack member 100 is connected by pivot block 101 to an operating rod 102 (corresponding to one of the operating rods 75, FIG. 13). In FIG. 16, the rocket device is viewed from the bottom, and it will be understood that main body 94 is provided with any suitable means (not shown) for mounting the rocket device on the load or load carrier (such as container 61, FIG. 13) to which the invention is applied.

It will be understood that, while the embodiments herein shown and described are particularly advantageous, and accomplish adjustment of the net normal component of the rocket thrust in a relatively simple fashion, the invention may be embodied in other forms than those illustrated without departing from the scope of the invention as defined in the appended claims.

What is claimed is:

1. In a device for cushioning the landing of a descending load, the combination of a frame adapted to be coupled to the load for descent therewith, reaction motor means mounted on said frame and effective to generate thrust having horizontal and vertical components when the load is in a normal position of descent, sensing means carried by said frame and operative to sense the horizontal component of relative motion between the load and the landing surface when the load has approached to within a predetermined distance from the landing surface, control means responsive to said sensing means and connected to said reaction motor means to control the latter so that said thrust will effectively oppose both the sensed horizontal component and the vertical component of said relative motion, and means for activating said reaction motor means, whereby when said reaction motor means has been controlled by said control means, said reaction motor means will deliver such thrust.

2. In a device for cushioning the landing of a descending load, the combination of a frame adapted to be coupled to the load for descent therewith, a plurality of reaction motor devices adjustably mounted on said frame and operative to generate thrust having horizontal and vertical components when the load is in a normal position of descent, sensing means carried by said frame and operative to sense the horizontal component of the relative motion of the load and the landing surface when the load approaches within a predetermined distance from the landing surface, motion transfer means controlled by said sensing means and operatively connected to adjust said motor devices to positions in which they effectively oppose both the horizontal and vertical components of said relative motion, and means for activating said motor devices to develop thrust when said motor devices have been so adjusted.

3. In a device for accomplishing safe landing of an aerial load, the combination of a load carrier; a plurality of rocket devices each having an exhaust nozzle, said rocket devices being mounted on said carrier in such fashion that the thrust from each rocket will have both a vertical and a horizontal component when said carrier is in a normal attitude of descent, each of said rocket devices being adjustable as to the horizontal component of its thrust; sensing means mounted on said carrier and operative to sense the horizontal component of the relative motion between said carrier and the landing surface when said carrier has approached within a predetermined distance from the landing surface; means controlled by said sensing means and connected to said rocket devices for adjusting the latter in such fashion that the thrust thereof will oppose the sensed horizontal component of said relative motion; and means for firing said rocket devices when said rocket devices have been so adjusted.

4. A device in accordance with claim 3 and wherein each of said rocket devices includes a rocket chamber mounted for rotation about an axis which is vertical when said carrier is in a normal attitude of descent and a nozzle fixed with respect to and directed downwardly and outwardly from said rocket body, and said means controlled by said sensing means comprises a plurality of motion transfer devices connected to rotate said rocket bodies.

5. A device in accordance with claim 4 and further comprising means holding said rocket chambers against rotation upon firing of said rocket devices.

6. In a device for accomplishing safe landing of an aerial load, the combination of a load carrier; a plurality of reaction motor nozzles mounted on said carrier each for rotation about a vertical axis when said carrier is in its intended attitude of descent, each of said nozzles being so oriented as to provide thrust having a horizontal component and a vertical component when said carrier is in its intended attitude of descent; sensing means, actuated upon approach of said carrier to within a predetermined distance from the landing surface, to sense the horizontal component of relative movement between said carrier and the landing surface; adjusting means controlled by said sensing means for selectively rotating said nozzles to positions in which the net thrust therefrom will effectively oppose both the sensed horizontal component and the vertical component of said relative motion; and means controlled by said sensing means for exhausting reaction fluid via said nozzles to develop such thrust when said nozzles have been so rotated by said adjusting means.

7. A device in accordance with claim 6 and wherein said nozzles are disposed at least substantially in a common plane perpendicular to the intended descent axis of said carrier.

8. A device in accordance with claim 7 and wherein said plane passes at least substantially through the center of gravity of said carrier and the load when said carrier supports the load.

9. In a device for cushioning the landing of a descending load, the combination of a frame adapted to be coupled to the load for descent therewith; reaction motor means mounted on said frame to generate thrust having horizontal and vertical components when the load is in its intended attitude of descent; a sensing probe depending from said frame for contact with the landing surface when the load approaches to within a predetermined distance from the landing surface, said probe being mounted for pivotal movement about all axes in a plane perpendicular to the intended descent axis of the load; means connected to said probe and operative to convert such pivotal movement into such adjustment of said reaction motor means that a horizontal thrust component provided by said reaction motor means will effectively oppose the horizontal component of relative movement between the load and landing surface responsible for such pivotal movement of said probe; and means operated by movement of said probe for activating said reaction motor means to generate such thrust.

10. A device in accordance with claim 9 and wherein said probe is also mounted for movement which is vertical when the load is in its intended attitude of descent.

11. A device in accordance with claim 9 and wherein said probe is telescopic.

12. A device in accordance with claim 9 and wherein said probe is provided at its tip with a plurality of lateral fins.

13. A cushioning device in accordance with claim 9 wherein said reaction motor means comprises a plurality of rocket devices each comprising an adjustable nozzle having a normal position in which fluid discharged from the nozzle is directed downwardly and outwardly when the load is in its intended descent attitude, said nozzles each being mounted for rotation about an axis which is vertical when the load is in its intended descent attitude; and said means connected to said probe comprises a mechanical movement having a plurality of movable output elements, said mechanical movement being connected to said probe for operation thereby and constructed to convert pivotal movement of said probe selectively into movement of said output elements; and motion transfer means connecting said output elements each to a different one of said nozzles to rotatably adjust the same, said nozzles being spaced in a closed series about the intended descend axis of the load.

14. A cushioning device in accordance with claim 13 and wherein said frame is a load container and said rocket devices are disposed outside thereof.

15. A cushioning device in accordance with claim 9 wherein said reaction motor means comprises a plurality of rocket devices each including a nozzle and an adjustable valve for controlling the discharge of reaction fluid from the nozzle, each of said nozzles being mounted on said frame in such position as to direct reaction fluid downwardly and outwardly when the load is in its intended descent attitude, said nozzles being spaced in a closed series about the descent axis of the load, said means connected to said probe being connected to said valves to adjust the same.

16. A cushioning device in accordance with claim 15 and further comprising a reaction fluid generator, and conduit means connecting said generator to supply fluid under pressure to said nozzles via said valves.

17. In a device for accomplishing safe landing of an aerial load, the combination of a load carrier; a plurality of rocket devices mounted on said carrier and each comprising a nozzle and a valve for controlling the discharge of reaction fluid by said nozzle, said rocket devices being spaced in a closed series about the intended descent axis of said carrier and each of said nozzles being so oriented as to provide thrust having a horizontal component and a vertical component when said carrier is in its intended attitude of descent; sensing means operative upon approach of said carrier to within a predetermined distance from the landing surface for sensing the horizontal component of relative movement between said carrier and the landing surface; and adjusting means controlled by said sensing means for selectively adjusting said valves to positions in which the net thrust from said nozzles will effectively oppose both the sensed horizontal component and the vertical component of said relative movement.

18. A device in accordance with claim 17 and wherein said sensing means comprises a probe depending from said carrier for contact with the landing surface and mounted for pivotal movement about all axes in a plane at right angles to the intended descent axis of said carrier, and said adjusting means comprises a member mounted for movement at right angles to said intended descent axis in response to pivoting of said probe, and a plurality of actuators each connecting said member to a different one of said valves.

19. In a device for cushioning the landing of a descending load, the combination of
  a frame adapted to be coupled to the load for descent therewith;
  a plurality of adjustable reaction motor devices mounted on said frame and operative upon activation thereof to generate a net thrust and thereby decrease the rate of descent of the load;
  sensing means mounted on said frame for movement relative thereto, said sensing means including a lower portion engageable with the landing surface for effecting relative movement between said sensing means and said frame;
  motion transfer means operably connected for adjusting said motor devices in response to predetermined movement of said sensing means relative to said frame; and
  means for activating said motor devices upon predetermined relative movement of said sensing means relative to said frame.

20. In a device for cushioning the landing of a descending load, the combination of
  a frame adapted to be coupled to the load for descent therewith;
  a plurality of reaction motor devices mounted on said frame and operative upon activation thereof to produce a net thrust of such direction and magnitude as to decrease the rate of descent of the load, said motor devices being adjustable so that at least the direction of the net thrust can be adjusted;
  selectively operable means for activating said motor devices;
  sensing means including at least one probe mounted on said frame for movement relative thereto,
  said probe extending downwardly from said frame and being adapted to engage a landing surface to effect such movement between said frame and said probe when the load has approached to within a predetermined distance from the landing surface,
  said sensing means being operative to operate said selectively operable means upon occurrence of a predetermined component of movement of said probe relative to said frame; and
  motion transmitting means operably connected for adjusting said motor devices in response to occurrence of other predetermined components of movement of said probe relative to said frame.

21. A device in accordance with claim 20 and wherein said motion transmitting means is arranged to adjust said motor devices prior to activation thereof.

22. In a device for cushioning the landing of a descending load, the combination of
  a frame adapted to be coupled to the load for descent therewith;
  reaction motor means coupled to said frame in such fashion that thrust generated by said reaction motor means is generally opposed to normal descending travel of the load,
  said reaction motor means being arranged for adjustment to vary the direction of the net thrust generated thereby with respect to the direction of descending travel of the load;
  sensing means carried by said frame and operative to sense the relation between the direction of descending travel of the load and a landing surface when the load has approached to within a predetermined distance from the landing surface;
  control means responsive to said sensing means and connected to said reaction motor means to adjust the latter to vary the net thrust thereof in accordance with the relation between the direction of descending travel of the load and the landing surface; and
  means for activating said reaction motor means in response to approach of the load to within a predetermined distance from the landing surface.

References Cited in the file of this patent

UNITED STATES PATENTS

| 2,024,274 | Campini | Dec. 17, 1935 |
| 2,560,445 | Jackson | July 10, 1951 |
| 2,857,740 | Hall et al. | Oct. 28, 1958 |
| 2,872,138 | Vogt | Feb. 3, 1959 |
| 2,986,877 | Emmons et al. | June 6, 1961 |

FOREIGN PATENTS

| 650,118 | France | Sept. 11, 1928 |